US 8,233,443 B2
Jul. 31, 2012

(12) United States Patent
Aoki et al.

(54) WIRELESS COMMUNICATION APPARATUS AND WIRELESS COMMUNICATION METHOD

(75) Inventors: Hidenori Aoki, Yokohama (JP); Kengo Yagyu, Yokohama (JP); Shinji Takeda, Yokohama (JP); Atsushi Fujiwara, Yokohama (JP); Yoichi Matsumoto, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 728 days.

(21) Appl. No.: 11/908,307

(22) PCT Filed: Mar. 3, 2006

(86) PCT No.: PCT/JP2006/304099
§ 371 (c)(1),
(2), (4) Date: Mar. 5, 2008

(87) PCT Pub. No.: WO2006/095650
PCT Pub. Date: Sep. 14, 2006

(65) Prior Publication Data
US 2009/0268663 A1 Oct. 29, 2009

(30) Foreign Application Priority Data
Mar. 11, 2005 (JP) .................................. 2005-069607

(51) Int. Cl.
*H04W 4/00* (2009.01)
(52) U.S. Cl. ........................................................ 370/329
(58) Field of Classification Search .................. 370/329; 375/355
See application file for complete search history.

(56) References Cited

U.S. PATENT DOCUMENTS

| 2003/0016732 A1* | 1/2003 | Miklos et al. ................ 375/132 |
| 2003/0216135 A1 | 11/2003 | McDaniel et al. |
| 2004/0133703 A1 | 7/2004 | Habetha |

FOREIGN PATENT DOCUMENTS

| EP | 1 383 283 A1 | 1/2004 |
| EP | 1 511 237 A2 | 3/2005 |
| EP | 1 511 237 A3 | 3/2005 |
| JP | 2004 147015 | 5/2004 |
| JP | 2004 304399 | 10/2004 |
| JP | 2005-322982 A | 11/2005 |

(Continued)

OTHER PUBLICATIONS

The Institute of Electrical and Electronics Engineers, Inc., ("IEEE"), "IEEE Wireless LAN Edition—A Compilation Based on IEEE STD. 802. 11TM-1999 (R2003) and Its Amendments-", pp. 13-15, 27-28, 141-146, 2003.

(Continued)

*Primary Examiner* — Chandrahas Patel
(74) *Attorney, Agent, or Firm* — Oblon, Spivak, McClelland, Maier & Neustadt, L.L.P.

(57) ABSTRACT

A wireless communication apparatus is provided. The wireless communication apparatus includes: detection means that detects that there is another wireless communication apparatus around the wireless communication apparatus; comparison means that compares a first reference value managed in the wireless communication apparatus with a second reference value managed in the another wireless communication apparatus; means that corrects the first reference value based on the comparison result; and means that announces the first reference value to the another wireless communication apparatus. Frequencies are set such that a frequency of the wireless communication apparatus becomes same as a frequency of still another wireless communication apparatus to which a radio wave of the wireless communication apparatus does not reach but a radio wave of the another wireless communication apparatus reaches.

9 Claims, 10 Drawing Sheets

FOREIGN PATENT DOCUMENTS

| | | |
|---|---|---|
| WO | WO 2004/014062 A2 | 2/2004 |
| WO | 2004 023827 | 3/2004 |
| WO | 2004 030258 | 4/2004 |
| WO | WO 2005/011203 A1 | 2/2005 |

OTHER PUBLICATIONS

J. Bray, et al., "Bluetooth Connect Without Cables", Prentice-Hall, Inc, pp. 41-44, 2001.

Search Report issued Sep. 17, 2010, in European Patent Application No. EP 06 71 5182.

Japanese Office Action mailed on Sep. 7, 2010 in corresponding Japanese Application No. 2005-069607 (with partial English Translation).

* cited by examiner

WIRELESS COMMUNICATION APPARATUS AND WIRELESS COMMUNICATION METHOD

TECHNICAL FIELD

The present invention generally relates to a technical field of wireless communication. More particularly, the present invention relates to a wireless communication apparatus and a wireless communication method in an ad hoc network using a plurality of wireless communication apparatuses (to be also referred to as wireless nodes or nodes).

BACKGROUND ART

In this type of technical field, a network scheme called an ad hoc network, a multi-hop network, a mesh network or the like is receiving attention. In the ad hoc network, neighboring wireless nodes can directly communicate with each other without a fixed infrastructure such as access points (APs) or wireless base stations, and it is allowed to pass through one or more wireless nodes for transmitting information to a wireless node of a communication partner.

According to the ad hoc network, a wireless network can be flexibly constructed even in a place where the fixed infrastructure is not provided. Therefore, it holds promise as an economical network constructing method. The ad hoc network can be utilized not only as an indoor communication environment such as a home or an office but also as an outside private or public network such as a hot spot. In addition, since the ad hoc network does not require the fixed infrastructure, it is also effective for constructing a temporary network in a time of disaster.

FIG. 1 is a schematic diagram showing an overall view of an ad hoc network, and shows a plurality of nodes that are nodes A-G. The ad hoc network does not require an apparatus for centrally controlling or managing a plurality of nodes, but it is necessary that frequencies used for nodes related to the communication are the same. That is, a sending apparatus and a receiving apparatus in each node performing communication needs to operate with a same frequency, and each node needs to have a frequency synchronization function for selecting such a frequency.

For example, in a wireless LAN system described in a non-patent document 1, two communication modes are defined. One of them is called a BSS mode in which a communication terminal (STA: station) performs communication via a wireless base station that is an access point AP. In the BSS mode, the access point AP comprehensively determines a frequency used for communication, so that each communication terminal STA receives announcement information (also to be referred to as a beacon) that is sent periodically or irregularly to tune to the frequency used in the access point AP.

Another is called an iBSS mode in which communication terminals STA are directly connected with each other by a wireless line to perform communication under a condition that all communication terminals STA are placed within a range where a radio wave of each communication terminal reaches each other communication terminal. In the iBSS mode, a node checks whether it can receive a beacon sent by another node, and when the node cannot detect the beacon sent by the another node, the communication terminal STA (the node) determines a frequency to be used to send a beacon. In addition, when the node can detect a beacon sent from another node, the communication terminal tunes itself to the frequency indicated by the beacon.

In the Bluetooth indicated in a non-patent document 2, there are two categories that are a master and a slave for a node, and a node functioning as the master determines a frequency so that a node of the slave synchronizes the frequency according to the frequency determined by the master. In this case, only one master can exist in a network (pico-network).

[Non Patent document 1] The Institute of Electrical and Electronics Engineers, Inc., ("IEEE"), "IEEE Wireless LAN Edition—A compilation based on IEEE Std 802.11TM-1999 (R2003) and its amendments—", 2003

[Non Patent document 2] J. Bray, Charles F Sturman, "Bluetooth Connect Without Cables", Prentice-Hall, Inc, 2001

DISCLOSURE OF THE INVENTION

Problem to be Solved by the Invention

According to the conventional techniques such as the non-patent documents 1 and 2 of the BSS mode, it is assumed that a node having a centralized control function such as the access point AP comprehensively controls one or more nodes STA under the node. It is technically possible to place the node including the centralized control function in an ad hoc network. However, there is a risk that the mechanism based on connection to one centralized control node may decrease reliability of the network. The reason why is that the number of nodes forming the network and positional relationship of nodes (network topology) change one after another so that line quality of a wireless link connecting between nodes is apt to unstably change.

For example, there are risks that communication quality of many nodes is deteriorated, further communication quality of the whole network is deteriorated and communication is interrupted due to an event that a node having the centralized control function departs from the network or due to an event that wireless line quality on a part of a route to the node having the centralized controlling function is deteriorated or the like.

In the iBSS mode of the non-patent document 1, although such node including the centralized controlling function is not necessary, it is assumed that all nodes forming the network are placed in an range where a radio wave of each node reaches every other node. Therefore, this technique is not proper in a case for expanding a network (multi-hop network) to a wider range area. For example, when setting is made such that a frequency $f_A$ is used in a range where a radio wave of a node A reaches and a frequency $f_B$ is used in a range where a radio wave of a node B reaches, networks are divided.

A frequency synchronization scheme is desired in which, in the above-mentioned constraints of the ad hoc network, frequencies used by all nodes are autonomously adjusted without dividing networks to stably keep communication even when node configuration is changed in the network.

The present invention is contrived for solving at least one of the above-mentioned problems, and an object is to provide a communication method and a wireless communication apparatus using the wireless communication method for causing wireless nodes related to information transmission to select a same frequency in an ad hoc network for transmitting information via one or more wireless nodes from a wireless node to another wireless node.

Means for Solving the Problem

In the present invention, a wireless communication apparatus in an ad hoc network is used. The wireless communication apparatus includes: detection means that detects that there is another wireless communication apparatus around the wireless communication apparatus; comparison means that compares a first reference value managed in the wireless communication apparatus with a second reference value managed in the another wireless communication apparatus; means that corrects the first reference value based on the comparison result; and means that announces the first reference value to the another wireless communication apparatus. Frequencies are determined such that a frequency of the wireless communication apparatus becomes same as a frequency of still another wireless communication apparatus to which a radio wave of the wireless communication apparatus does not reach but a radio wave of the another wireless communication apparatus reaches.

EFFECT OF THE INVENTION

According to an embodiment of the present invention, a same frequency can be efficiently set for wireless nodes related to information transmission in the ad hoc network.

Figure 1:
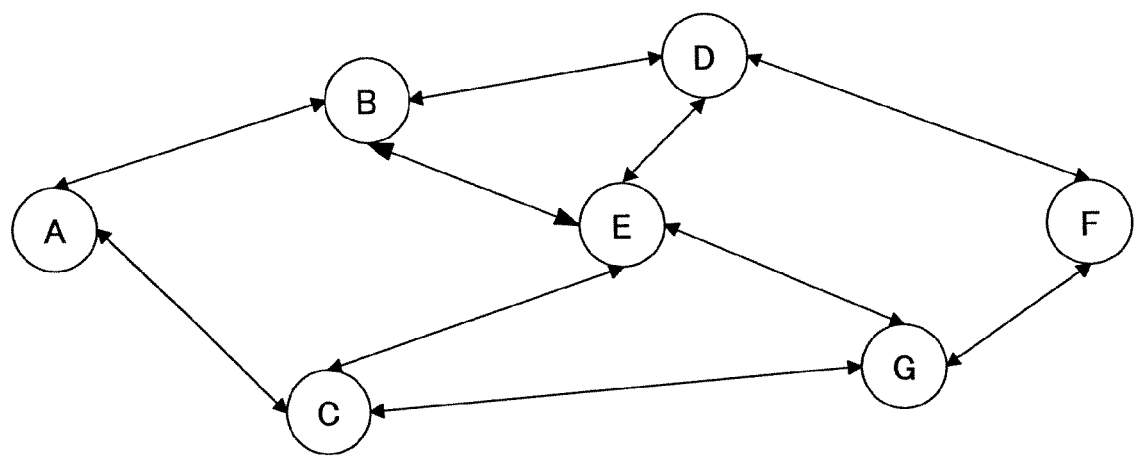
FIG. 1 is a diagram showing an overall view of an ad hoc network.

DESCRIPTION OF REFERENCE SIGNS 202 antenna
204 wireless interface
206 packet transferring unit
208 routing control unit
210 central processing unit (CPU)
212 storing unit
214 announcement information sending unit
216 announcement information receiving unit
218 reference value controlling unit
220 frequency controlling unit

PREFERRED EMBODIMENTS FOR CARRYING OUT THE INVENTION

According to an embodiment of the present invention, a wireless communication apparatus (node) in an ad hoc network receives an announcement signal, and compares a first reference value stored in the wireless communication apparatus with a second reference value included in the announcement signal. According to the comparison result, it is determined whether a frequency designated by the announcement signal is used for wireless communication. Since each node autonomously set frequencies without setting the frequencies beforehand, an ad hoc network (mesh network) can be constructed easily and flexibly. Since a frequency to be used in a node is autonomously determined by the node, the node can set the frequency stably irrespective of communication status of a particular node including a centralized control function.

In addition, since such a particular node is not required, even though any node in a network leaves the network, other nodes can maintain communication stably. Since it is not essential that all nodes exists within a range reachable by one hop, a same frequency can be easily determined between nodes more than one hop apart. The frequency to be determined or selected may be any frequency so that nodes of the whole network can be synchronized to an arbitrary frequency.

The first and the second reference values may be amounts represented by time. Such amount may be a time of a time point such as a launching time point, or may be an elapsed time from a time point. In this case, a node that has been operating from earlier time in the network can be given precedence, so that times of setting change of frequency in such a node can be decreased as much as possible. Since a timer function is provided in many nodes, it is advantageous to represent the reference value as an absolute time in a point that functions to be added to a node can be decreased. When using the elapsed time for the reference value, since it is only necessary that a timer for measuring a relatively short period from a launching time point is provided, it is not necessary to accurately know the absolute time so that it is advantageous in that a GPS or an accurate timer function is not necessary.

The first and the second reference values may be values other than time. Such a value may be a random number, an identifier specific to a wireless communication apparatus, communication quality or a number of wireless communication apparatuses connected the ad hoc network. When the random number is used, since it is extremely rare that two random numbers become the same, it can be determined frequency of which node is given precedence with reliability (collision or conflict can be extremely decreased). From the same viewpoint, the first and the second reference values may be represented by identifiers specific to the wireless communication apparatus. The first and the second reference values may be represented by communication quality. In this case, a frequency having a good quality can be used preferentially.

Necessity for adjusting frequency used for communication arises in a case when a plurality of networks each using a different frequency are integrated to one network in addition to a case when a node participates in a network. The present invention can be applied to either case. In the latter case, the first and the second reference value may be represented by numbers of wireless communication apparatuses already connected to the network. By giving precedence to a frequency of a network corresponding to a larger number of connecting apparatuses, the number of nodes that require setting change of frequency can be decreased.

The term "frequency" not only means a frequency that is a smallest unit used for communication by a node but also, if appropriate, means a band of frequencies that can be used. For example, the present invention may be used for adjustment of frequencies between a wireless communication apparatus that will use a band of 40 MHz in the future and a wireless communication apparatus that actually used a band of 20

MHz. Or, the present invention may be used for a situation in which a network using the band of 20 MHz and a network using the band of 40 MHz are integrated.

The first and the second reference values may be represented by a combination of an amount represented by time and a numerical value other than time. By representing by such a combination, a frequency to be used for communication can be determined with reliability according to the comparison result of the reference values.

According to an embodiment of the present invention, the first reference value may be changed to the second reference value according to the comparison result. For example, when the reference value is represented by time, the times can be synchronized by adjusting reference values between wireless communication apparatuses. By updating the reference value (at least a part of the reference value) in this way, time and frequency can be adjusted among all wireless communication apparatuses in the network.

When a plurality of network interfaces are provided in a node, it is desirable to manage frequency and the like for each network interface. In such a case, the announcement signal includes an identifier of an interface so that the interface may be identified by the identifier. In this case, the reference value may be managed for each interface.

In addition, when there are a plurality of ad hoc networks in a space where at least a part is physically the same, it is desirable to manage the reference value and the frequency and the like for each network. In such a case, an identifier of a network is included in the announcement signal so that only a node belonging to a network having a same identifier may be an object for management of the reference value and the like.

According to an embodiment of the present invention, an announcement signal including a first reference value is generated by a wireless communication apparatus, and it is sent to another wireless communication apparatus. An announcement signal including a value different from the first reference value as a reference value may be generated by the wireless communication apparatus so that it may be sent to another wireless communication apparatus. Accordingly, the wireless communication apparatus can forcedly determine a frequency used in the network to be one designated by the wireless communication apparatus.

For example, by announcing an announcement signal including a value (a time much earlier than an absolute time) different from the first reference value (the absolute time of launching time point) as a reference value by a wireless communication apparatus, the frequency designated by the wireless communication apparatus is given precedence in effect. Or, inversely, separately from a real reference value of the wireless communication apparatus, by announcing, as a reference value, an announcement signal always including a newest time, the contents of the frequency and the like designated by the wireless communication apparatus may not influence setting information of other wireless communication apparatuses.

[Embodiment 1]

Figure 2:
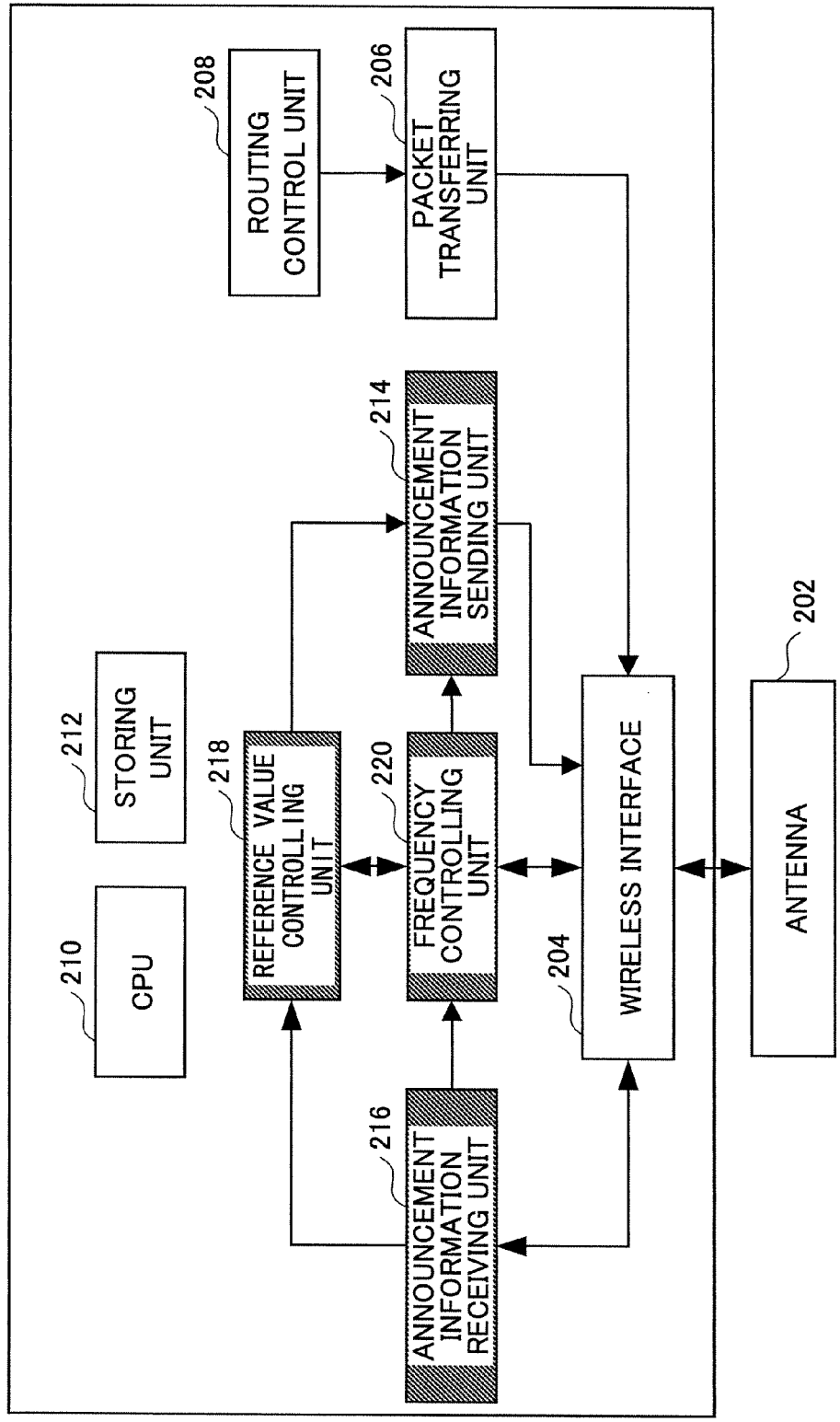
FIG. 2 is a functional block diagram of a communication apparatus according to an embodiment of the present invention.

FIG. 2 is a functional block diagram of a communication apparatus according to an embodiment of the present invention. The communication apparatus corresponds to one of a plurality of nodes forming a wireless ad hoc network. Other nodes have similar configuration and function. The communication apparatus includes an antenna 202, a wireless interface 204, a packet transferring unit 206, a routing control unit 208, a central processing unit (CPU) 210 and a storing unit 210. In addition to these components, the communication apparatus includes an announcement information sending unit 214, an announcement information receiving unit 216, a reference value controlling unit 218 and a frequency controlling unit 220.

The wireless interface 204 performs conversion processing between a wireless signal communicated via the antenna 202 and a signal used inside the communication apparatus. More particularly, processing such as format conversion between an analog signal and a digital signal, frequency conversion, bandwidth restriction, gain control and the like are performed. For example, processing relating to wireless signals according to the standard of IEEE 802.11 is performed. The packet transferring unit 206 generates a packet to be sent to another communication apparatus and passes the packet to the wireless interface 204. Payloads sent and received by a user are transmitted by this packet transferring unit 206. In this case, transmission routes of packets to be sent are managed by the routing control unit 208. The CPU 210 manages operation of each component in the communication apparatus. The storing unit 212 stores data necessary for the communication apparatus.

The announcement information sending unit 214 generates an announcement packet to provide it to the wireless interface 204. The announcement packet is announced to neighboring nodes. The announcement packet includes announcement information necessary for a frequency synchronization function between nodes in the network (function for adjusting frequencies exhibited according to the present invention). The announcement packet may be announced to another node periodically, or may be announced in response to a request from another node. The former case may be realized using a beacon and the like defined in the IEEE 802.11 standard. The latter case may be realized using a probe request and a probe response and the like defined in the IEEE 802.11 standard.

The announcement information invariably includes an after-mentioned "reference value". Other than that, it may includes a network identifier (ID), a frequency actually used for communication (use frequency), a frequency (reference frequency) selected by an algorithm of the present invention, information indicating whether the reference frequency is actually used, an identifier of the interface and the like. The identifier of the interface may include information indicating that it is an interface for a common channel (channel commonly used in the whole network). As described later, the node may set a frequency same as the reference frequency to be a use frequency, or may set a frequency different from the reference frequency to be a use frequency.

The announcement information receiving unit 216 receives an announcement packet announced from a neighboring node to obtain information necessary for frequency synchronization between nodes in the network. As mentioned before, the announcement packet may be passively received periodically from another node, or the own node may actively request the announcement packet from another node. Since the announcement information receiving unit 216 obtains information from neighboring another node, it can check whether another node is present or not in surroundings of the own node. A plurality of frequencies (channels) that can be used by a wireless node may exist. Thus, it is necessary that detection of a neighboring node in this case is performed for each frequency that may be used.

Figure 3:
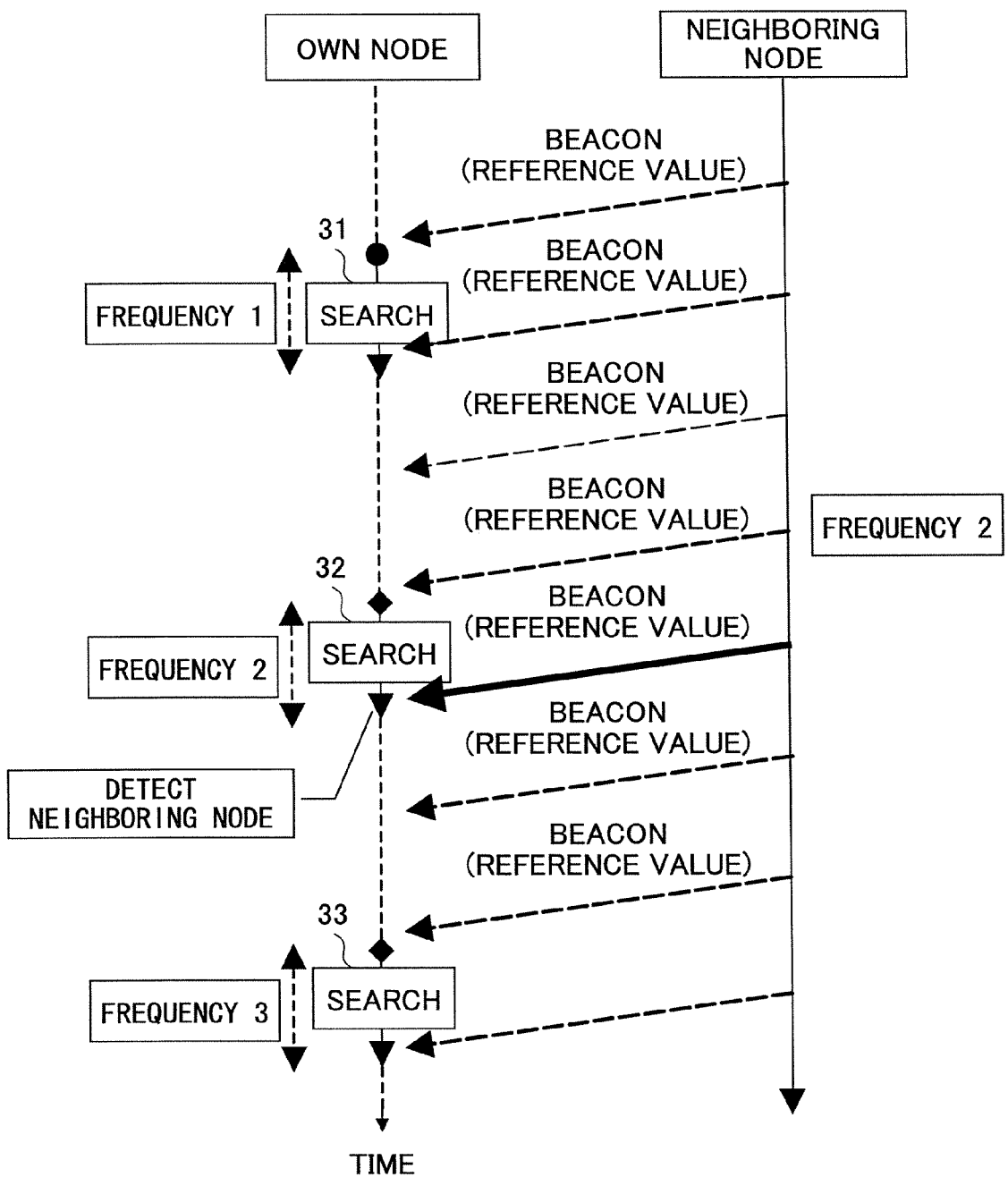
FIG. 3 shows a sequence chart for passively checking presence or absence of a neighboring node.

FIG. 3 shows a flowchart for checking presence or absence of another node in surroundings of the own node. In the example of the diagram, it is assumed that another node or a neighboring node exists near the own node, and that the another node is performing communication using a frequency $f_2$. It is assumed that frequencies that may be used by the own and the another nodes are $f_1$, $f_2$ and $f_3$. As shown in the diagram, the neighboring node periodically sends an announcement packet using a beacon, so that the announcement packet periodically arrives at the own node. In step 31, the own node checks presence or absence of another node that is performing communication using a frequency $f_1$. Since the neighboring node performs communication using a frequency $f_2$, the neighboring node is not detected at this stage. In step 32, the own node checks presence or absence of another node performing communication using a frequency $f_2$. Since the neighboring node is performing communication using the frequency $f_2$, the neighboring node is detected at this stage. In addition, in step 33, the own node checks presence or absence of another node that is performing communication using a frequency $f_3$. Since the neighboring node performs communication using a frequency $f_2$, the neighboring node is not detected at this stage. Accordingly, the own node can ascertain that there is the neighboring node that is performing communication using the frequency $f_2$. After that, a frequency to be used by the own node for communication between the neighboring node and the own node is determined according to a method described below.

Figure 4:
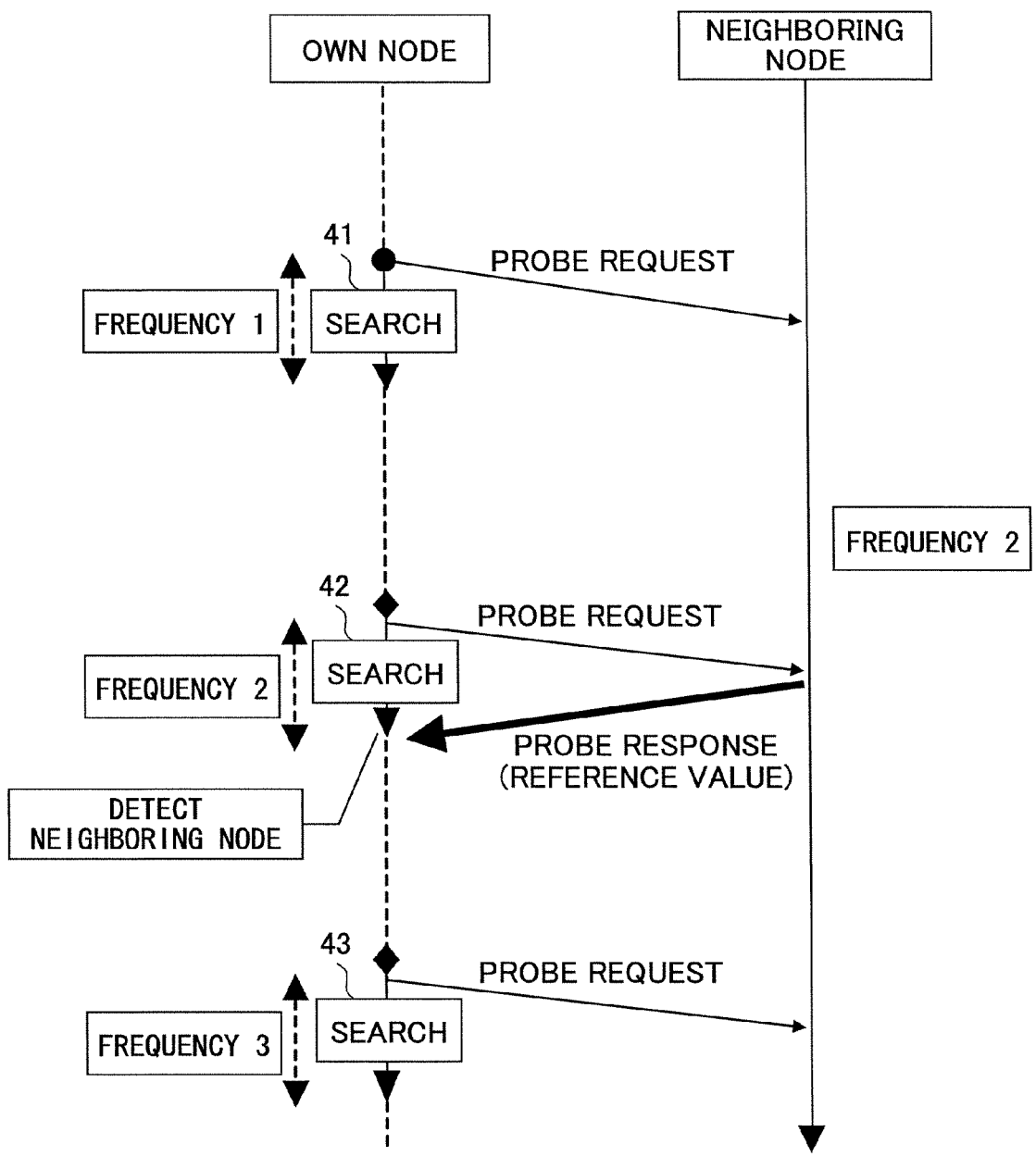
FIG. 4 shows a sequence chart for actively checking presence or absence of a neighboring node.

FIG. 4 also shows a flowchart for checking presence or absence of another node in surroundings of the own node. In the example shown in the diagram, it is assumed that another node or an neighboring node exists near the own node, and that the another node is performing communication using a frequency $f_2$. It is assumed that frequencies that may be used by the own and the another nodes are $f_1$, $f_2$ and $f_3$.

In this example, before step 41, the own node sends a probe request packet to a neighboring node. This probe request packet requests the neighboring node to respond if the neighboring node uses the frequency $f_1$. Since the neighboring node is performing communication using the frequency $f_2$, response is not performed so that the neighboring node is not detected at this stage. Before step 42, the own node sends a probe request packet to a neighboring adjacent node. This probe request packet requests the neighboring node to respond if the neighboring node uses the frequency $f_2$. Since the neighboring node is performing communication using the frequency $f_2$, response is performed so that the neighboring node is detected. Before step 43, the own node sends a probe request packet to a neighboring adjacent node. This probe request packet requests the neighboring node to respond if the neighboring node uses the frequency $f_3$. Since the neighboring node is performing communication using the frequency $f_2$, response is not performed so that the neighboring node is not detected at this stage. Accordingly, the own node can ascertain that there is a neighboring node that is performing communication using the frequency $f_2$.

After that, a frequency to be used by the own node for communication between the neighboring node and the own node is determined according to a method described below. As shown in FIGS. 3 and 4, the neighboring node can be detected passively or actively.

By the way, when checking presence or absence of a neighboring node, a network ID can be used together. For example, when there are a plurality of networks, it is necessary to detect a neighboring node for each network (network interface). In such a case, the network ID may be used. In this case, it is determined that there is a neighboring node only when an network ID announced by the neighboring node agrees with a network ID held by the own node.

As to a detection method of a neighboring node, a method described in Japanese Laid-Open Patent Application No. 2004-48503 may be used. However, since a neighboring node is tried to be detected in layer 3 in an so-called mobile IP network according to this known technique, it may not be easy to apply this technique as it is to processing of embodiments of the present invention that assume processing in layer 2.

The detection result of the neighboring node and contents of the received announcement information are supplied to the reference value controlling unit 218 and the frequency controlling unit 220 shown in FIG. 2.

The reference value controlling unit 218 manages a reference value of the own node. More particularly, the reference value controlling unit 218 compares a reference value obtained from a neighboring node with a reference value stored in the storing unit 212 of the own node and the like, and updates the reference value of the own node based on the comparison result (for example, the reference value of the own node is replaced with a reference value of another node). The comparison of the reference value or update of the reference value in the reference value controlling unit 218 is typically performed when the announcement information receiving unit 216 detects a neighboring node. Various forms may be taken as the reference value supplied from the announcement information receiving unit 216. In the present embodiment, an elapsed time from a time point is adopted as the reference value. The time point may be a time point at which the node is launched, for example. By the way, as mentioned later, when the reference value is an amount representing the elapsed time, the reference value may be updated as necessary regardless of presence or absence of the neighboring node.

The reference value controlling unit 218 compares an elapsed time (reference value) of the own node with an elapsed time (reference value) of the neighboring node to check length of the elapsed times. As a result of the comparison, it is determined which node provides a longer elapsed time. When the elapsed time received from the neighboring node is longer, the elapsed time of the own node is replaced with the elapsed time of the neighboring node. On the other hand, when the elapsed time received from the neighboring node is shorter, the elapsed time of the own node is maintained. After that, the elapsed time as the reference value is updated one after another as time passes. The comparison result in the reference value controlling unit 218 is reported to the frequency controlling unit 220 and the announcement information sending unit 214.

The frequency controlling unit 220 manages a frequencies of the own node based on the comparison result from the reference value controlling unit 218 and the like. However, when an interface ID is used, management of frequencies is performed for each network interface. The communication apparatus selects a frequency (reference frequency) to be used at the node when launching or when entering a network. Although various selection methods can be considered, there is a method, as an example, for observing using status of available frequencies so as to select a frequency that is used least of all.

When the comparison result reported from the reference value controlling unit 218 indicates that the elapsed time of the own node is longer, it is permitted to perform communication using the reference frequency. On the other hand, when it indicates that the elapsed time of the another node is longer, it is not permitted to perform communication using the reference frequency. In this case, communication is performed using a frequency used in another node. In the examples shown in FIGS. 3 and 4, when the neighboring node has a longer elapsed time and the own node tries to use the frequency $f_2$ (reference frequency is $f_2$), the own node may use the frequency $f_2$. In this case, the frequency controlling unit 220 determines the reference frequency $f_2$ to be a frequency (use frequency) to be actually used, and report the determination result to the wireless interface 204.

However, in the examples shown in FIGS. 3 and 4, when the neighboring node has a longer elapsed time and the own node tries to use the frequency $f_1$ (reference frequency is $f_1$), it is not permitted, and the own node should perform communication using the frequency $f_2$. In this case, the frequency controlling unit 220 determines $f_2$ to be a frequency (use frequency) used for actual communication, and reports the determination result to the wireless interface 204. The reference frequency of the own node is changed from $f_1$ to $f_2$. The reference frequency is included in announcement information, and forms a part of information announced to another node.

Figure 5:
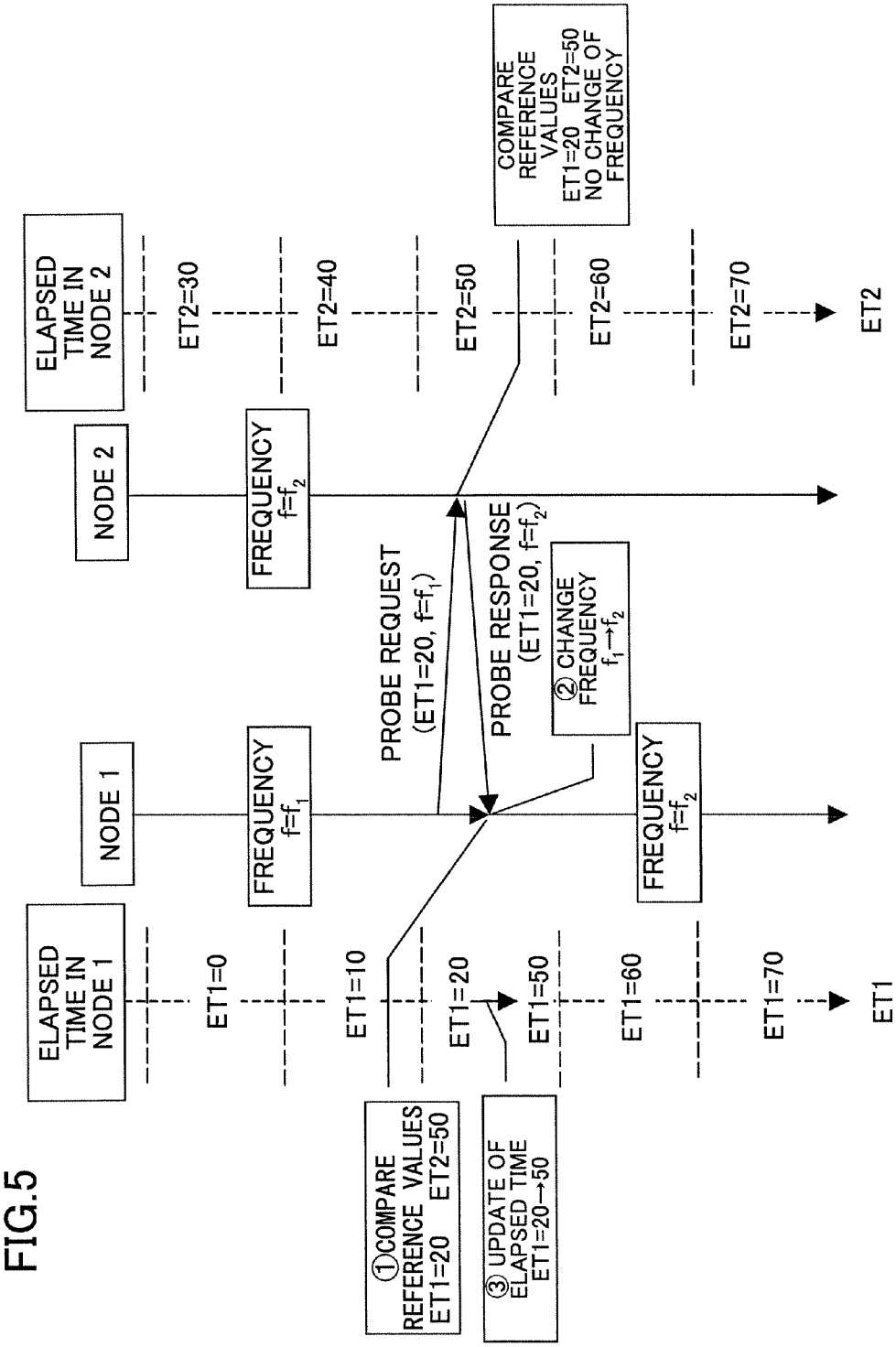
FIG. 5 is a sequence chart showing a method for matching use frequencies among a plurality of nodes.

FIG. 5 is a flowchart showing a method for unifying use frequencies among a plurality of nodes according to an embodiment of the present invention. In the diagram, the downward vertical axis follows lapse of time. In the left side of the diagram, an arrow with a broken line indicates an elapsed time ET1 that is timed or counted from the time when the node 1 launches. The elapsed time may be timed continuously using hour, minute, second and the like similarly to a time. But, for the sake of simplicity, it is assumed that the elapsed time takes a discrete value such as 0, 10, 20, . . . in the present embodiment. For example, a period of ET1=10 follows a period of ET1=0. In the right side of the diagram, an arrow with a broken line indicates an elapsed time ET2 that is timed from the time when the node 2 launches. Also, the elapsed time takes discrete values such as 0, 10, 20, . . . . The reference frequency of the node 1 (frequency which the node 1 tries to use for communication) is set to be $f_1$ initially. It is assumed that the frequency is not in use at this time. Also, it is assumed that a reference frequency of the node 2 is set to be $f_2$ and that the node 2 has a track record of performing actual communication using the frequency $f_2$ before the node 1 is launched. That is, the use frequency of the node 1 has not been determined yet, but the use frequency of the node 2 is $f_2$.

In the node 1, an elapsed time is measured after launching, so that the elapsed time ET1 increases like 0, 10, . . . . The node 1 detects presence or absence of a neighboring node. In the present embodiment, an active detection method described with reference to FIG. 4 is used (a passive detection method shown in FIG. 3 may be used). In the example shown in the figure, the node 1 sends a probe request packet on the frequency $f_2$. Since a reference frequency of the node 2 that receives the probe request packet is $f_2$, the node 2 returns a probe response packet. The probe response packet includes an elapsed time ET2 (=50) of the node 2 at the time of transmission.

The node 1 that receives the probe response packet compares the two elapsed times ET1 and ET2 by the reference value controlling unit 218 shown in FIG. 2. In the example shown in the figure, this process is performed within a period indicated as ET1=20. In this example, since ET1=20<ET2=50 holds true, the reference frequency and the use frequency of the node 2 are given precedence. Therefore, the reference frequency of the node 1 is changed from $f_1$ to $f_2$, and the use frequency is set to be $f_2$.

On the other hand, also in the side of the node 2, the announced elapsed time ET1=20 is compared with the elapsed time ET2=50 of the node 2 within a period indicated by ET2=50. Since ET1=20<ET2=50 holds true, the reference frequency and the use frequency of the node 2 are given precedence. Therefore, the frequency of the node 2 is not changed from $f_2$, and the use frequency remains to be $f_2$.

Accordingly, one corresponding to the longer elapsed time is given precedence so that the number of times of setting changes in a node that has operated longer can be kept small as much as possible.

In the node 1, the elapsed time ET1 is changed from 20 to 50 with update of the reference frequency. After that, the elapsed time of the node 1 increases like 50, 60, 70, . . . . Accordingly, elapsed times of the node 1 and the node 2 can be synchronized with each other. Further, since the elapsed times (reference values) of the node 1 and the node 2 are the same, a node entering the network after that may tune its frequency to either the node 1 or the node 2. Therefore, by properly updating the reference value, even though a new entering node resides in a place where radio waves of the node 1 do not reach, the new entering node can tune its frequency to the nodes 1 and 2 when the new entering node can communicate with the node 2.

Figure 6:
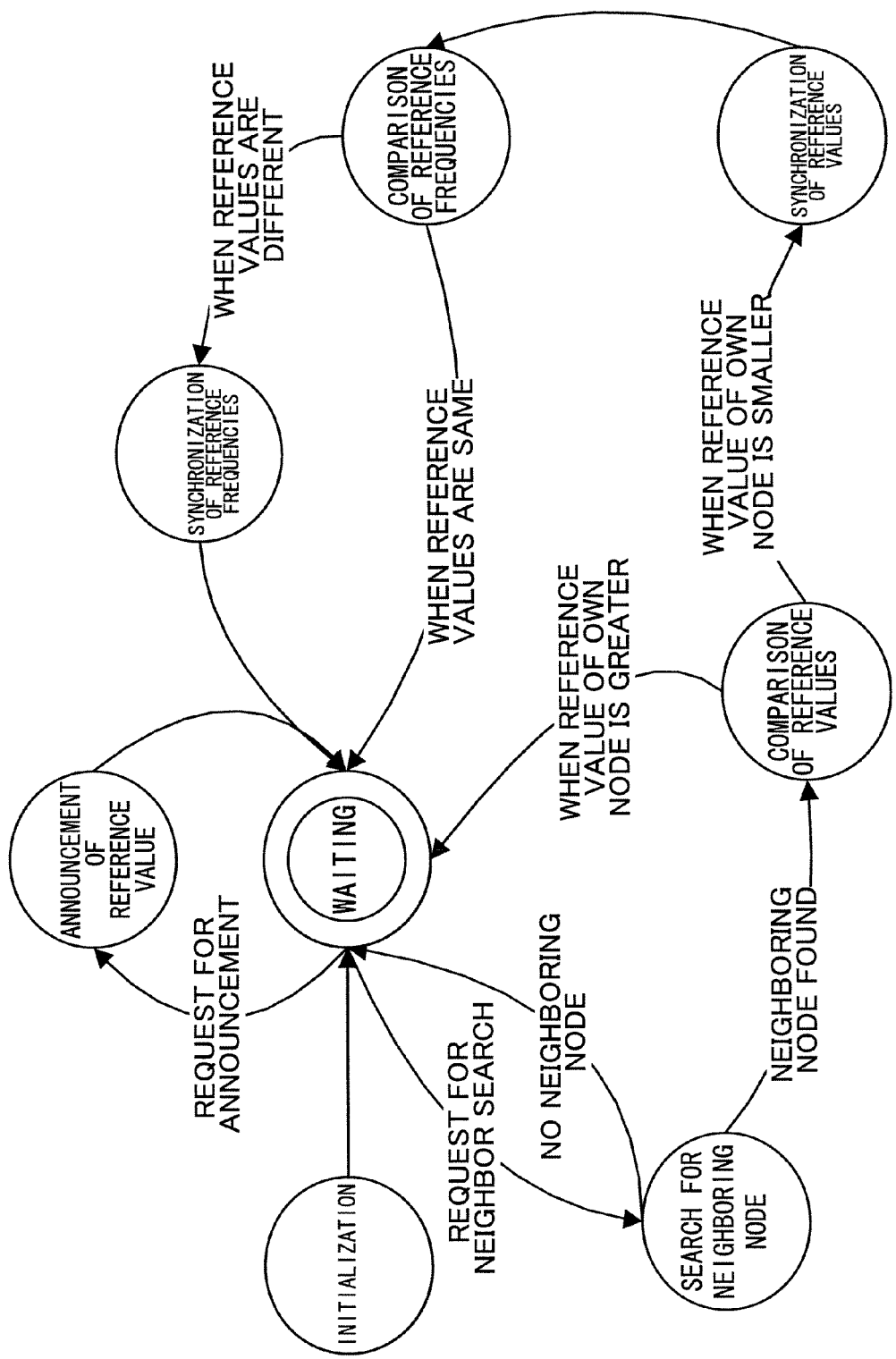
FIG. 6 is a state transition diagram on operation of the communication apparatus.

FIG. 6 is a state transition diagram on operation of the communication apparatus shown in FIG. 2. As to the present invention, states shown in the diagram is assumed as "initialization", "waiting", "search for neighboring node", "comparison of reference values", "synchronization of reference values", "comparison of reference frequencies", "synchronization of reference frequencies" and "announcement of reference value".

(Initialization)

In this state, the reference value and the reference frequency are initialized. A frequency used least in neighboring nodes may be automatically selected as an initial reference frequency, or some sort of frequency may be set manually as the reference frequency (manual setting). The reference frequency may be adopted as it is as a frequency (use frequency) which the own node actually uses. Or, as mentioned later, a frequency different from the reference frequency may be used. In the state of the initialization, a network ID for identifying a network and an interface ID for identifying an interface may be set. When a node implements a plurality of wireless interfaces, interface IDs may be used such that the reference value and the reference frequency can be set for each interface. After initialization, the state changes to "waiting" state.

(Waiting)

In this state that is represented by double circles, the communication apparatus waits until the state changes to a next state. This state is a basic state among state transitions after the initialization. State transition from the "waiting" state to a next state may be performed after elapse of a time or may be performed according to an event.

(Search for Neighboring Node)

A node reaches this state after transition from the "waiting" state. This transition is performed at a time managed by a timer and the like or performed when receiving a request of search for a neighboring node. When the neighboring node is not detected by the announcement signal receiving unit 216 shown in FIG. 2, the state returns back to the "waiting" state. When the neighboring node is detected, the node obtains information of a reference value, a reference frequency and an interface ID and the like of the neighboring node, and moves to "comparison of reference values" state.

The reference frequency of the neighboring node may be found by detecting a use frequency of the neighboring node, or it may be extracted from an announcement packet received from the neighboring node. When the neighboring node is detected, the node moves to the "comparison of reference values" state, and when it is not detected, the node returns to the "waiting" state. When a network ID is inserted into the announcement packet and when a network ID to which the own node belongs is different from the network ID obtained from the neighboring node, the node returns to the "waiting" state since such a case is the same as a case where a neighboring node is not found.

(Comparison of Reference Values)

In this state, comparison between a reference value of the own node and a reference value of the detected neighboring node is performed so that one of them is selected (a larger value is selected, for example). When the reference value of the own node is selected, transition to the "waiting" state is performed. When the reference value of the neighboring node is selected, transition to the "synchronization of reference values" is performed.

As the reference value, various ones other than the above-mentioned elapsed time may be used. Reference values below are not restrictively cited but merely exemplary ones.

(a) Absolute Time When Launching

The time (absolute time) when the node was launched may be used as the reference value. In this case, each node needs to be provided with at least a function for ascertaining the time, so each node needs to be provided with a timer, a GPS or the like. By comparing times when nodes were launched, a frequency of a node that has been operating longer is given precedence so that the number of nodes that require setting change of a frequency can be decreased as much as possible. Since the function such as the timer is provided in the communication apparatus in many cases, it is unnecessary to prepare a special mechanism only for managing the reference value.

(b) Elapsed Time From Launching

As shown in the example of FIG. 5, an elapsed time from the time of launching of each node may be used as the reference value. By comparing lengths of elapsed times, a frequency of a node that has been operating from earlier time can be given precedence. When using the elapsed time for the reference value, a timer that can be properly reset for measuring the elapsed time is necessary. In addition, it is desirable that the timer can adjust the elapsed time according to the comparison result of the reference value controlling unit 218. The adjustment may include not only resetting but also progressing or delaying time.

(c) Identifier Unique to Each Node

A random number generated by each node or a value (MAC address and the like) unique to each node may be used as the reference value. There is a possibility that reference values represented by time become same values as a result of comparison. Thus, there may occur a case where which node should be given precedence is not clear. By adopting a value uniquely corresponding to a node, precedence among competing nodes can be clearly determined.

(d) Number of Nodes Already Connected to a Network

In a case when a plurality of networks exist and a different use frequency is currently set for each network but these networks will be integrated in the future, the number of nodes that has been already connected to each network can be used as a reference value. It is necessary that each node includes a counter for managing a number of nodes connecting to a network, and that each node updates the number periodically or irregularly one after another. For example, when there are a network A to which three nodes are connected and a network B to which ten nodes are connected and the networks are integrated, it can be considered that a use frequency of the network B is given precedence. Accordingly, the number of nodes in which setting change of the use frequency is performed can be kept small as much as possible.

(e) Quality of Use Frequency

Communication quality in a use frequency that is used for actual communication may be used as the reference value. The communication quality may be represented by SIR and the like for example. By selecting a frequency of low utilization from among available frequencies, communication quality and utilization efficiency for communication resources can be improved. Measurement of communication quality may be performed periodically or irregularly.

(f) Combinations

As shown in the example shown in FIG. 5, reference frequency and the like is updated based on difference of elapsed times. Therefore, when the elapsed times are the same, the reference frequencies cannot be adjusted. For addressing this problem, it can be considered to use a different reference value additionally or alternatively. For example, in addition to the elapsed time, a MAC address or a random number value may be used for a reference value. When absolute values or elapsed times or the like are the same, a node can be given precedence by comparing information of MAC addresses or random numbers or the like. That is, the reference value can be represented as an elapsed time and a MAC address (and/or random number). In the IEEE 802.11 standard, information on time is communicated between nodes, the above-mentioned form is desirable for communication apparatuses complying with such standard. By the way, combinations of reference values are not limited to these, and any proper combination may be used.

(Synchronization of Reference Values)

In the "Synchronization of reference values" state of FIG. 6, a reference value of the own node is adjusted to a reference value of another node (replaced or updated). After that, the node moves to the "comparison of reference frequencies" state.

(Comparison of Reference Frequencies)

In this state, a reference frequency of a neighboring node and a reference frequency of the own node are compared. When they are the same, transition to the "waiting" state is performed. When they are different, transition to the "synchronization of reference frequencies" is performed.

(Synchronization of Reference Frequency)

In this state, a reference frequency of the own node is changed to a reference frequency of another node. After that, transition to the "waiting" state is performed. When the reference frequency is set to be a use frequency, change of the use frequency is also performed according to the change of the reference frequency. Accordingly, change of the reference frequency is performed by comparing reference values.

Figure 7:
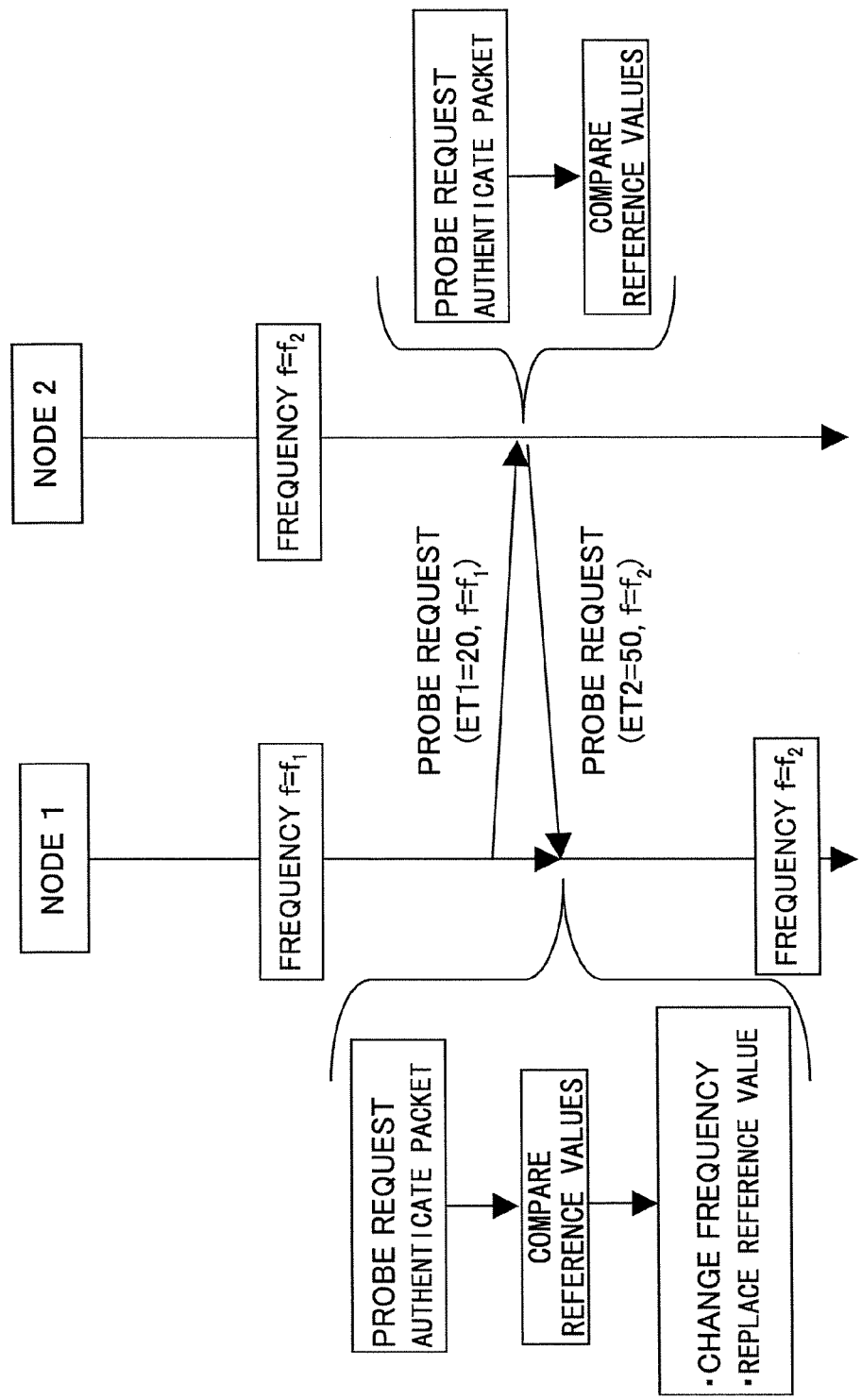
FIG. 7 is a sequence chart showing an example of a method for authenticating the neighboring node.
Figure 8:
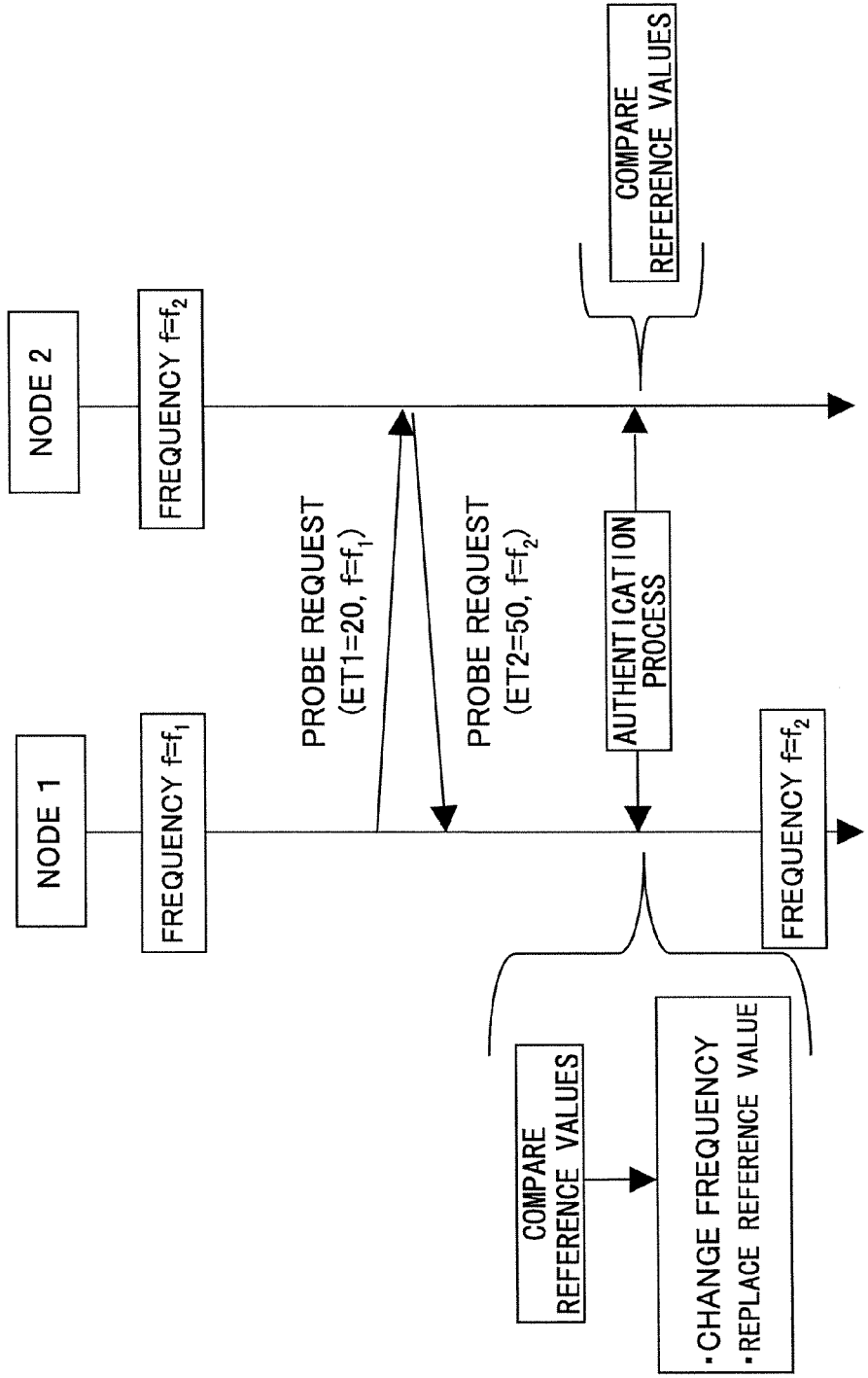
FIG. 8 is a sequence chart showing another example of a method for authenticating the neighboring node.

By the way, since change of the reference value or the frequency affects not only communication environment of the node but also communication environment of other nodes, it should be done properly and carefully. In view of increasing security, it is desirable to consider whether reference information announced from another node is reliable, and after authentication, perform control of the reference value, change of a frequency or the like. As an authentication method of the neighboring node, an authentication code may be added to the announcement packet (FIG. 7). In this case, an announcement packet including an authentication code is transmitted from a node to another node, and authentication is performed in the another node. Then, an announcement packet including an authentication code is transmitted from the another node to the node, and authentication is performed in the node. Alternatively, after some sort of authentication by a authentication process function unit, the reference value or the frequency may be changed in accordance with information of the authentication packet (FIG. 8).

When there are a plurality of neighboring nodes, a plurality of announcement packets may be received from the plurality of nodes. In this case, the reference value or the frequency may be updated each time when receiving an announcement packet, or the reference value or the like may be changed after elapse of a constant time. In the former case, since there is a possibility that change of the reference value or the frequency occurs frequently, high speed processing becomes necessary. As to the latter case, updating occurrence frequency of the frequency and the like is limited to equal to or less than a constant value so that operation can be stabilized.

However, depending on the length of the period of waiting, there is a possibility that the reference value of the own node changes while waiting for the constant time (for example, the elapsed time ET may progress). Therefore, when receiving the announcement packet, it is desirable to manage a reference value of the own node at the time when receiving the announcement packet for each neighboring node. By the way, the point that there is a risk that the reference value may change while waiting needs to be addressed irrespective of the number of neighboring nodes. In addition, when waiting for a constant time, there is a possibility to receive announcement packets, from a plurality of nodes, indicating a value (desirable value) better than the reference value of the own node within the constant time. In this case, the node may change its reference value to a reference value indicating the best value among them.

In a typical ad hoc network, there is an equal relationship among a plurality of nodes that form the ad hoc network, and it is not necessary that a particular node manages all nodes in a centralized manner. However, it is not necessary to prohibit that a particular node includes such a collective management function (centralized control function). That is, a node having some sort of privilege may provide another node with an opportunity to change a use frequency in a network.

More particularly, although depending on a reference value to be used, it can be considered, when an elapsed time is used as a reference value, to change the reference frequency to a desired frequency and announce a reference value in which a time equal to or greater than a constant value is forcibly elapsed to another node. Since the forcibly adjusted elapsed time is longer than elapsed time of any other nodes, as a result of comparison of reference values in each node, the reference value and the frequency and the like to be used in the particular node are given precedence. On the contrary, by announcing a time shorter than elapsed time of any other node (a newest time, a future time, for example) to the another node, the node may not relate to determining the reference value and the frequency.

(Announcement of Reference Value)

This state is a state following the "waiting" state, and it occurs when receiving a request from a neighboring node, when a period managed by a timer and the like in the own node expires, when receiving an announcement request of a reference value, or when other necessity occurs. In this state, the node sends an announcement packet including a reference value, and after that, transfers to the "waiting" state again. In addition to the reference value, information such as a reference frequency, a use frequency, a network ID, an interface ID and the like may be announced.

[Embodiment 2]

When one node implements a plurality of wireless interfaces (IFa, IFb, for example), a different frequency may be used for each wireless interface to decrease effects of radio wave interference among wireless interfaces. Therefore, it is desirable that processes such as search for a neighboring node and management of a reference value or a frequency are performed for each wireless interface. Therefore, it is desirable that a node implementing a plurality of wireless interfaces sends an announcement packet including an interface ID provided for each wireless interface to a neighboring node. The announcement information receiving unit 216, the reference value controlling unit 218, the frequency controlling unit 220 and the like can manage status and settings for each wireless interface based on the received ID.

By the way, when there are a plurality of networks, communications are performed among nodes belonging to a same network. When belonging networks are different, operation such as adjusting frequency is not performed between nodes even though the nodes are within a range where radio waves can reach to each other. Therefore, when there are a plurality of networks, it is desirable that the announcement packet includes an network ID for identifying a network. Therefore, when a node includes a plurality of interfaces and there are a plurality of networks, frequency and the like is managed for each interface among nodes belonging to a same network.

Figure 9:
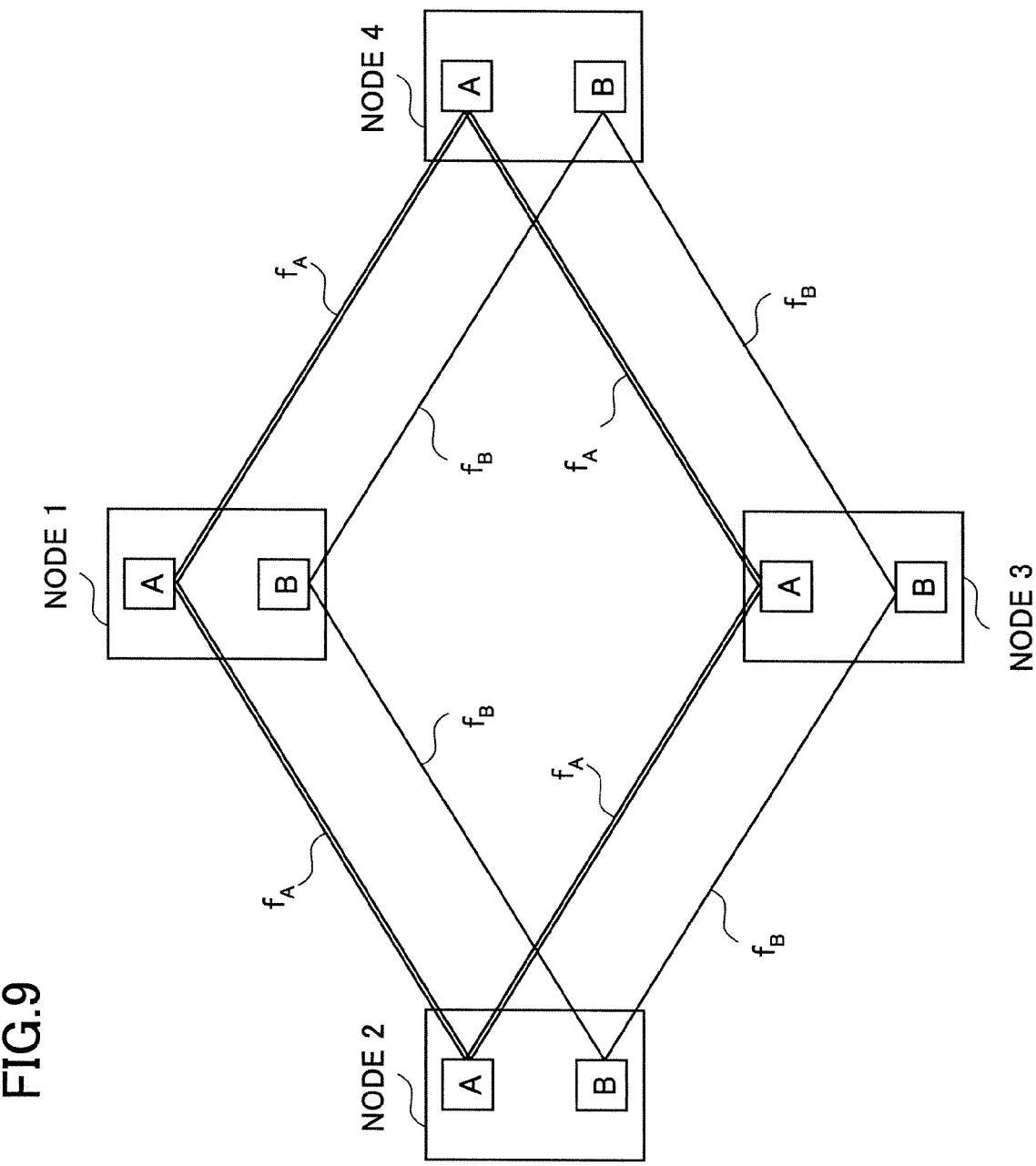
FIG. 9 is a diagram showing an ad hoc network in which each node uses a plurality of wireless interfaces.

FIG. 9 is a diagram showing the whole of the ad hoc network. In this example, each of four nodes can use two wireless interfaces A and B. Each of the wireless interfaces A and B can be identified by each of interface identifiers IFa and IFb. By using the IDs, frequencies used for each wireless interface are determined separately. It is assumed that all of the nodes 1-4 shown in the figure belong to a same network. A frequency commonly used for the whole of the network is determined by the method described in the embodiment 1. In the example shown in FIG. 9, the reference frequency and the use frequency of the wireless interface A for every node are set to be $f_A$. In addition, the reference frequency and the use frequency of the wireless interface B for every node are set to be $f_B$.

Figure 10:
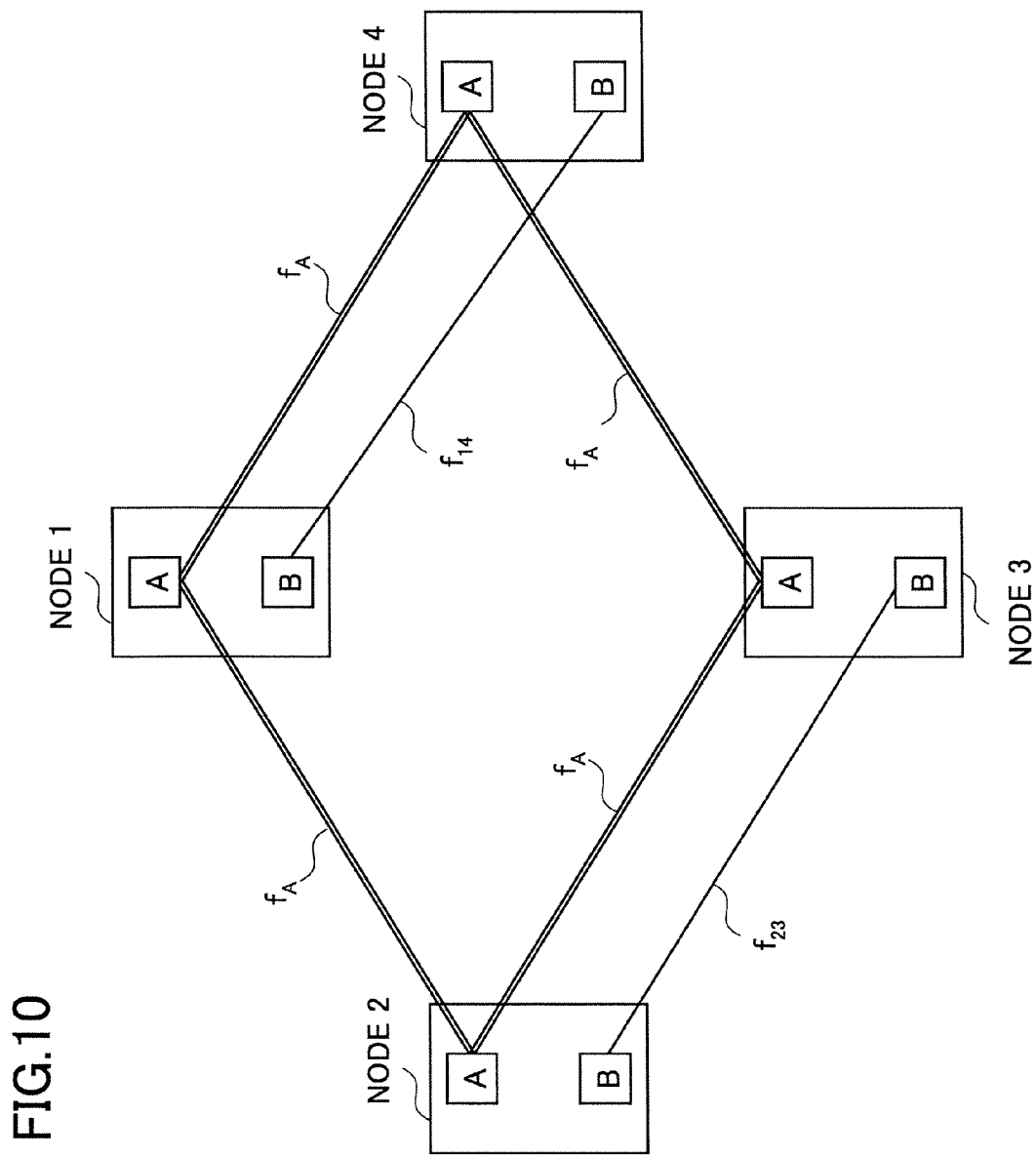
FIG. 10 is a schematic diagram showing another ad hoc network in which each node uses a plurality of wireless interfaces.

FIG. 10 also shows a figure showing a whole ad hoc network. Also in this example, each of the four nodes can use two wireless interfaces A and B. In the example shown in the figure, the reference frequency and the use frequency of the wireless interface A of every node are set to be $f_A$. The frequency $f_A$ is determined by the method described in the embodiment 1. In contrast, a frequency used by the wireless interface B of the node 1 and the node 4 is set to be $f_{14}$. The frequency $f_{14}$ may be arbitrarily determined between the node 1 and the node 4. Therefore, the frequency $f_{14}$ may be determined by the method described in the embodiment 1 or may be determined by a method other than that. Because, the frequency $f_{14}$ is not one used uniformly by all nodes, but it is only necessary that the frequency $f_{14}$ is proper for communication between the node 1 and the node 4. In addition, a frequency used by the wireless interface B of the node 2 and the node 3 is set to be $f_{23}$. The frequency $f_{23}$ may be determined by the method described in the embodiment 1 or may be determined by a method other than that. Because, the frequency $f_{23}$ is not one used uniformly by all nodes, but it is only necessary that the frequency $f_{23}$ is proper for communication between the node 2 and the node 3.

Therefore, each of the frequency (use frequency) $f_{14}$ used for communication between the nodes 1 and 4 and the use frequency $f_{23}$ between the nodes 2 and 3 may be the same as or different from the reference frequency $f_B$ on the wireless interface B. If they are the same, a situation shown in FIG. 9 is realized, and if they are different, a situation shown in FIG. 10 is realized. For identifying the situations shown in FIGS. 9 and 10 by each node, the announcement packet relating to the wireless interface B may include information indicating relationship between the reference frequency $f_B$ and the use frequency $f_{ij}$. Alternatively, the announcement packet may include not only the reference frequency $f_B$ but also information indicating the use frequency $f_{ij}$.

The present application claims priority based on Japanese patent application No. 2005-069607, filed in the JPO on Mar. 11, 2005, and the entire contents of No. 2005-069607 are incorporated herein by reference.

The invention claimed is:

1. A wireless communication apparatus in a mesh network, comprising:
    means for detecting another wireless communication apparatus around the wireless communication apparatus;
    means for comparing a first reference value managed in the wireless communication apparatus with a second reference value managed in the another wireless communication apparatus to produce a comparison result;
    means for correcting the first reference value based on the comparison result;
    means for announcing the first reference value to the another wireless communication apparatus;
    means for generating an announcement signal including the first reference value which is changed to the second reference value; and
    means for sending the generated announcement signal to the another wireless communication apparatus,
    wherein a channel of the wireless communication apparatus is conformed to a channel of still another wireless communication apparatus to which a radio wave of the wireless communication apparatus does not reach, but a radio wave of the another wireless communication apparatus reaches, and
    each of the first and the second reference values is at least one of a random number and a number of wireless communication apparatuses connected to the mesh network.

2. The wireless communication apparatus as claimed in claim 1, wherein each of the first and the second reference values is represented by one or more of a time, an elapsed time from a time, a random number, an identifier specific to a wireless communication apparatus, communication quality, and a number of wireless communication apparatuses connected to the mesh network.

3. The wireless communication apparatus as claimed in claim 1, wherein each of the first and the second reference values is an amount represented by a time.

4. The wireless communication apparatus as claimed in claim 1, wherein each of the first and the second reference values is a value other than time.

5. The wireless communication apparatus as claimed in claim 1, wherein each of the first and the second reference values is represented by a combination of an amount represented by time and a numerical value other than time.

6. A wireless communication method used in a wireless communication apparatus in a mesh network, comprising:
    storing a first reference value;
    receiving, from another wireless communication apparatus, an announcement signal including a second reference value;
    comparing the first reference value with the second reference value to produce a comparison result;
    determining whether to use a channel designated by the received announcement signal for wireless communication according to the comparison result;
    generating an announcement signal including the first reference value which is changed to the second reference value; and
    sending the generated announcement signal to the another wireless communication apparatus, wherein
    each of the first and the second reference values is at least one of a random number and a number of wireless communication apparatuses connected to the mesh network.

7. A wireless communication apparatus in a mesh network, comprising:
    a storing unit configured to store a first reference value;
    a receiving unit configured to receive an announcement signal including a second reference value from another wireless communication apparatus;
    a comparison unit configured to compare the first reference value with the second reference value to produce a comparison result;
    a determination unit configured to determine whether to use a channel designated by the received announcement signal for wireless communication according to the comparison result; and
    an announcement unit configured to generate an announcement signal including the first reference value which is changed to the second reference value, and to send the generated announcement signal to the another wireless communication apparatus, wherein
    each of the first and the second reference values is at least one of a random number and a number of wireless communication apparatuses connected to the mesh network.

8. The wireless communication apparatus as claimed in claim 7, wherein,
    the announcement unit is further configured to generate another announcement signal including, as a reference value, a value different from the first reference value to send to the another wireless communication apparatus.

9. The wireless communication apparatus as claimed in claim 7, wherein the determination unit is further configured to change the first reference value to the second reference value according to the comparison result.

* * * * *